(12) United States Patent
Donneau-Golencer et al.

(10) Patent No.: US 10,140,322 B2
(45) Date of Patent: Nov. 27, 2018

(54) TOOLS AND TECHNIQUES FOR EXTRACTING KNOWLEDGE FROM UNSTRUCTURED DATA RETRIEVED FROM PERSONAL DATA SOURCES

(71) Applicant: salesforce.com, inc., San Francisco, CA (US)

(72) Inventors: Thierry Donneau-Golencer, Menlo Park, CA (US); Rajan Singh, San Jose, CA (US); Madhu Yarlagadda, Los Altos, CA (US); Corey Hulen, Menlo Park, CA (US); Kenneth C. Nitz, Redwood City, CA (US); William Scott Mark, San Mateo, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 0 days.

(21) Appl. No.: 15/234,871

(22) Filed: Aug. 11, 2016

(65) Prior Publication Data
US 2016/0350342 A1    Dec. 1, 2016

Related U.S. Application Data

(63) Continuation of application No. 13/287,983, filed on Nov. 2, 2011, now Pat. No. 9,443,007.

(51) Int. Cl.
*G06F 7/00* (2006.01)
*G06F 17/30* (2006.01)

(52) U.S. Cl.
CPC .... *G06F 17/30312* (2013.01); *G06F 17/3043* (2013.01); *G06F 17/30654* (2013.01); *G06F 17/30702* (2013.01)

(58) Field of Classification Search
CPC ........... G06F 17/30312; G06F 17/3043; G06F 17/30654; G06F 17/30702;
(Continued)

(56) References Cited

U.S. PATENT DOCUMENTS 2,454,039 A    11/1948 Cox
2,484,865 A    10/1949 Strickland, Jr.
(Continued)

FOREIGN PATENT DOCUMENTS

GB    502152    3/1939

OTHER PUBLICATIONS

Heidorn, "Natural Language Dialogue for Managing an On-Line Calendar", Proceedings of the 1978 Annual Conference, ACM, 1978, pp. 45-52.
(Continued)

*Primary Examiner* — Azam Cheema
(74) *Attorney, Agent, or Firm* — Schwabe Williamson & Wyatt

(57) ABSTRACT

A system may include multiple personal data sources and a machine-implemented data extractor and correlator configured to retrieve personal data from at least one of the personal data sources. The data extractor and correlator may extract information from unstructured data within the retrieved personal data and correlate the extracted information with previously stored structured data to generate additional structured data. The system may also include a storage device configured to store the previously stored structured data and the additional structured data. A natural language query module may be configured to receive a natural language query from a user and provide a response to the natural language query based at least in part on one or both of the previously stored structured data and the additional structured data.

6 Claims, 9 Drawing Sheets

(58) Field of Classification Search
CPC ......... G06F 17/30684; G06F 17/30696; G06F 17/30657; G06Q 30/0243; G06Q 30/0249; G06Q 30/0251; G06Q 30/0255
See application file for complete search history.

(56) References Cited

U.S. PATENT DOCUMENTS

| | | |
|---|---|---|
| 2,493,785 A | 1/1950 | Strickland, Jr. |
| 2,598,694 A | 6/1952 | Kerbenar |
| 2,657,301 A | 10/1953 | Kincaid |
| 2,971,160 A | 3/1954 | Segsworth |
| 2,714,647 A | 8/1955 | Good |
| 2,819,370 A | 1/1958 | Osborn, Jr. |
| 3,051,812 A | 8/1962 | Gschwender |
| 3,143,628 A | 8/1964 | Golden |
| 3,502,310 A | 3/1970 | Coffman |
| 3,601,571 A | 8/1971 | Curcio |
| 3,775,831 A | 12/1973 | Cachat |
| 4,021,274 A | 5/1977 | Chadwick |
| 4,673,785 A | 6/1987 | Damiani |
| 4,831,552 A | 5/1989 | Scully |
| 5,438,660 A | 8/1995 | Lee |
| 5,577,188 A | 11/1996 | Zhu |
| 5,608,872 A | 3/1997 | Schwartz et al. |
| 5,649,104 A | 7/1997 | Carleton et al. |
| 5,664,109 A * | 9/1997 | Johnson ............. G06Q 40/08 705/2 |
| 5,715,450 A | 2/1998 | Ambrose et al. |
| 5,761,419 A | 6/1998 | Schwartz et al. |
| 5,774,867 A | 6/1998 | Fitzpatrick |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,480,830 B1 | 11/2002 | Ford |
| 6,513,063 B1 | 1/2003 | Julia |
| 6,523,061 B1 | 2/2003 | Halverson |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,079 B1 | 8/2003 | Ruvolo |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,738,767 B1 | 5/2004 | Bhatt |
| 6,742,021 B1 | 5/2004 | Halverson |
| 6,754,681 B2 | 6/2004 | Brodersen et al. |
| 6,757,718 B1 | 6/2004 | Halverson |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,036,128 B1 | 4/2006 | Julia |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,113,797 B2 | 9/2006 | Kelley |
| 7,139,722 B2 | 11/2006 | Perella |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,340,484 B2 | 3/2008 | S |
| 7,343,365 B2 | 3/2008 | Farnham |
| 7,356,482 B2 | 4/2008 | Frankland et al. |
| 7,370,282 B2 | 5/2008 | Cary |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,433,876 B2 | 10/2008 | Spivak |
| 7,454,509 B2 | 11/2008 | Boulter et al. |
| 7,475,021 B2 | 1/2009 | Wilbrink |
| 7,508,789 B2 | 3/2009 | Chan |
| 7,509,388 B2 | 3/2009 | Allen |
| 7,587,501 B2 | 9/2009 | Stillion |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,704,496 B2 | 4/2010 | Goddard |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,809,599 B2 | 10/2010 | Andrew |
| 7,827,208 B2 | 11/2010 | Bosworth et al. |
| 7,840,543 B2 | 11/2010 | Guiheneuf |
| 7,853,881 B1 | 12/2010 | Aly Assal et al. |
| 7,904,321 B2 | 3/2011 | Moore |
| 7,945,653 B2 | 5/2011 | Zukerberg et al. |
| 7,958,003 B2 | 6/2011 | De Vries |
| 7,979,319 B2 | 7/2011 | Toulotte |
| 7,992,085 B2 | 8/2011 | Wang-Aryattanwanich |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,032,508 B2 | 10/2011 | Martinez |

(56) References Cited

U.S. PATENT DOCUMENTS

| | | |
|---|---|---|
| 8,060,567 B2 | 11/2011 | Carroll |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,244,821 B2 | 8/2012 | Carroll |
| 8,275,836 B2 | 9/2012 | Beaven et al. |
| 8,280,984 B2 | 10/2012 | Lance |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,548,951 B2 | 10/2013 | Solmer |
| 8,566,301 B2 | 10/2013 | Rueben et al. |
| 8,612,876 B2 | 12/2013 | Barnett |
| 8,646,103 B2 | 2/2014 | Jakobson et al. |
| 8,682,736 B2 | 3/2014 | Flake |
| 8,799,826 B2 | 8/2014 | Missig |
| 8,805,833 B2 | 8/2014 | Nath |
| 8,849,806 B2 | 9/2014 | Walker |
| 8,918,431 B2 | 12/2014 | Mark |
| 8,983,500 B2 | 3/2015 | Yach |
| 9,245,010 B1 | 1/2016 | Donneau-Golencer |
| 9,298,818 B1 | 3/2016 | Donneau-Golencer |
| 9,330,381 B2 | 5/2016 | Anzures |
| 9,471,666 B2 | 10/2016 | Singh |
| 9,704,138 B2 | 7/2017 | Siegel |
| 9,720,574 B2 | 8/2017 | Siu |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0101169 A1 | 5/2003 | Bhatt |
| 2003/0120675 A1 | 6/2003 | Stauber et al. |
| 2003/0135565 A1 | 7/2003 | Estrada |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0138944 A1 | 7/2004 | Whitacre et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0027805 A1 | 2/2005 | Aoki |
| 2005/0050555 A1 | 3/2005 | Exley et al. |
| 2005/0091098 A1 | 4/2005 | Brodersen et al. |
| 2005/0114777 A1 | 5/2005 | Szeto |
| 2005/0197954 A1 | 9/2005 | Maitland |
| 2006/0085436 A1 | 4/2006 | Dettinger |
| 2006/0089945 A1 | 4/2006 | Paval |
| 2006/0095556 A1 | 5/2006 | Arnold |
| 2006/0190833 A1 | 8/2006 | SanGiovanni |
| 2006/0212330 A1 | 9/2006 | Savilampi |
| 2006/0245641 A1 | 11/2006 | Viola |
| 2007/0198648 A1 | 8/2007 | Allen |
| 2007/0219875 A1 | 9/2007 | Toulotte |
| 2007/0244976 A1 | 10/2007 | Carroll |
| 2008/0094205 A1 | 4/2008 | Thorn |
| 2008/0140498 A1 | 6/2008 | Setty |
| 2008/0148181 A1 | 6/2008 | Reyes |
| 2008/0195705 A1 | 8/2008 | Lee |
| 2008/0249972 A1 | 10/2008 | Dillon |
| 2009/0063415 A1 | 3/2009 | Chatfield et al. |
| 2009/0070322 A1 | 3/2009 | Salvetti |
| 2009/0100342 A1 | 4/2009 | Jakobson |
| 2009/0106224 A1 | 4/2009 | Roulland |
| 2009/0125817 A1 | 5/2009 | O'Sullivan |
| 2009/0177744 A1 | 7/2009 | Marlow et al. |
| 2009/0259670 A1 | 10/2009 | Inmon |
| 2009/0307162 A1 | 12/2009 | Bui |
| 2010/0004971 A1 | 1/2010 | Lee |
| 2010/0030715 A1 | 2/2010 | Eustice |
| 2010/0069035 A1 | 3/2010 | Johnson |
| 2010/0122190 A1 | 5/2010 | Lu |
| 2010/0153160 A1 | 6/2010 | Bezemer et al. |
| 2010/0162105 A1 | 6/2010 | Beebe |
| 2010/0179961 A1 | 7/2010 | Berry |
| 2010/0180200 A1 | 7/2010 | Donneau-Golencer |
| 2011/0099189 A1 | 4/2011 | Barraclough |
| 2011/0131202 A1* | 6/2011 | Cohen ............... G06F 17/30702 707/723 |
| 2011/0218958 A1 | 9/2011 | Warshavsky |
| 2011/0239158 A1 | 9/2011 | Barraclough |
| 2011/0247051 A1 | 10/2011 | Bulumulla |
| 2011/0295612 A1 | 12/2011 | Donneau-Golencer |
| 2011/0295852 A1* | 12/2011 | Wang ................ G06F 17/30867 707/728 |
| 2012/0016678 A1 | 1/2012 | Gruber |
| 2012/0030194 A1 | 2/2012 | Jain |
| 2012/0042218 A1 | 2/2012 | Cinarkaya |
| 2012/0066393 A1 | 3/2012 | Tekwani |
| 2012/0124153 A1 | 5/2012 | Carroll |
| 2012/0131020 A1 | 5/2012 | Nitz |
| 2012/0150979 A1 | 6/2012 | Monaco |
| 2012/0158472 A1 | 6/2012 | Singh |
| 2012/0173464 A1 | 7/2012 | Tur |
| 2012/0191501 A1 | 7/2012 | Olliphant |
| 2012/0233137 A1 | 9/2012 | Jakobson et al. |
| 2012/0233531 A1 | 9/2012 | Ma |
| 2012/0234824 A1 | 9/2012 | Nakatsu |
| 2012/0290407 A1 | 11/2012 | Hubbard et al. |
| 2012/0290950 A1 | 11/2012 | Rapaport |
| 2012/0297312 A1 | 11/2012 | Lance |
| 2012/0297321 A1 | 11/2012 | Douglas |
| 2013/0024924 A1 | 1/2013 | Brady |
| 2013/0036117 A1 | 2/2013 | Fisher |
| 2013/0036369 A1 | 2/2013 | Mitchell |
| 2013/0066921 A1 | 3/2013 | Mark et al. |
| 2013/0110842 A1 | 5/2013 | Donneau-Golencer |
| 2013/0185336 A1 | 7/2013 | Singh |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0035949 A1 | 2/2014 | Singh |
| 2014/0046876 A1 | 2/2014 | Zhang |
| 2014/0136612 A1 | 5/2014 | Redfern |
| 2014/0143685 A1 | 5/2014 | Rekhi |

(56) References Cited

U.S. PATENT DOCUMENTS

2014/0164510 A1    6/2014   Abuelsaad
2014/0225897 A1    8/2014   Sarrazin
2014/0359537 A1   12/2014   Jackobson et al.
2015/0135094 A1    5/2015   Donneau-Golencer
2015/0135095 A1    5/2015   Donneau-Golencer

OTHER PUBLICATIONS

Modi, et al., "CMRadar: A Personal Assistant Agent for Calendar Management", Department of Computer Science, Carnegie Mellon University, Springer-Verlag Berlin Heidelberg, 2005, pp. 169-181.
Schwabe Williamson & Wyatt, PC Listing of Related cases; Nov. 3, 2016; 2 pages.
"Google Plus Users", Google+Ripples; Oct. 31, 2011; 3 pages.

\* cited by examiner

_US 10,140,322 B2_

TOOLS AND TECHNIQUES FOR EXTRACTING KNOWLEDGE FROM UNSTRUCTURED DATA RETRIEVED FROM PERSONAL DATA SOURCES

The application is a continuation patent application of U.S. patent application Ser. No. 13/287,983, filed Nov. 2, 2011, which is herein incorporated by reference in its entirety.

BACKGROUND

The modern abundance of personal data from sources such as email, contacts, and documents cannot be overstated. Indeed, there exists a significant lack of and ever-growing need for even greater abilities to process such data in meaningful ways so as to provide a user with opportunities to do more than mere keyword searches or similar actions. Current systems offer limited use of information within personal and public data and generally provide a user with little more than typical search engine functionality.

There remains a need for a way to address these and other problems associated with the prior art. More particularly, there remains a need for greater leveraging of personal data for a user, particularly with regard to unstructured data.

DETAILED DESCRIPTION

The disclosed technology relates generally to data processing, query processing, and more particularly but not exclusively to systems and methods for processing document and text data. For example, knowledge may be harvested from unstructured data and subsequently relied on or used to provide a user with meaningful information that ties together multiple pieces of data from any of a number of personal data sources and, in some embodiments, public data sources.

Figure 1:
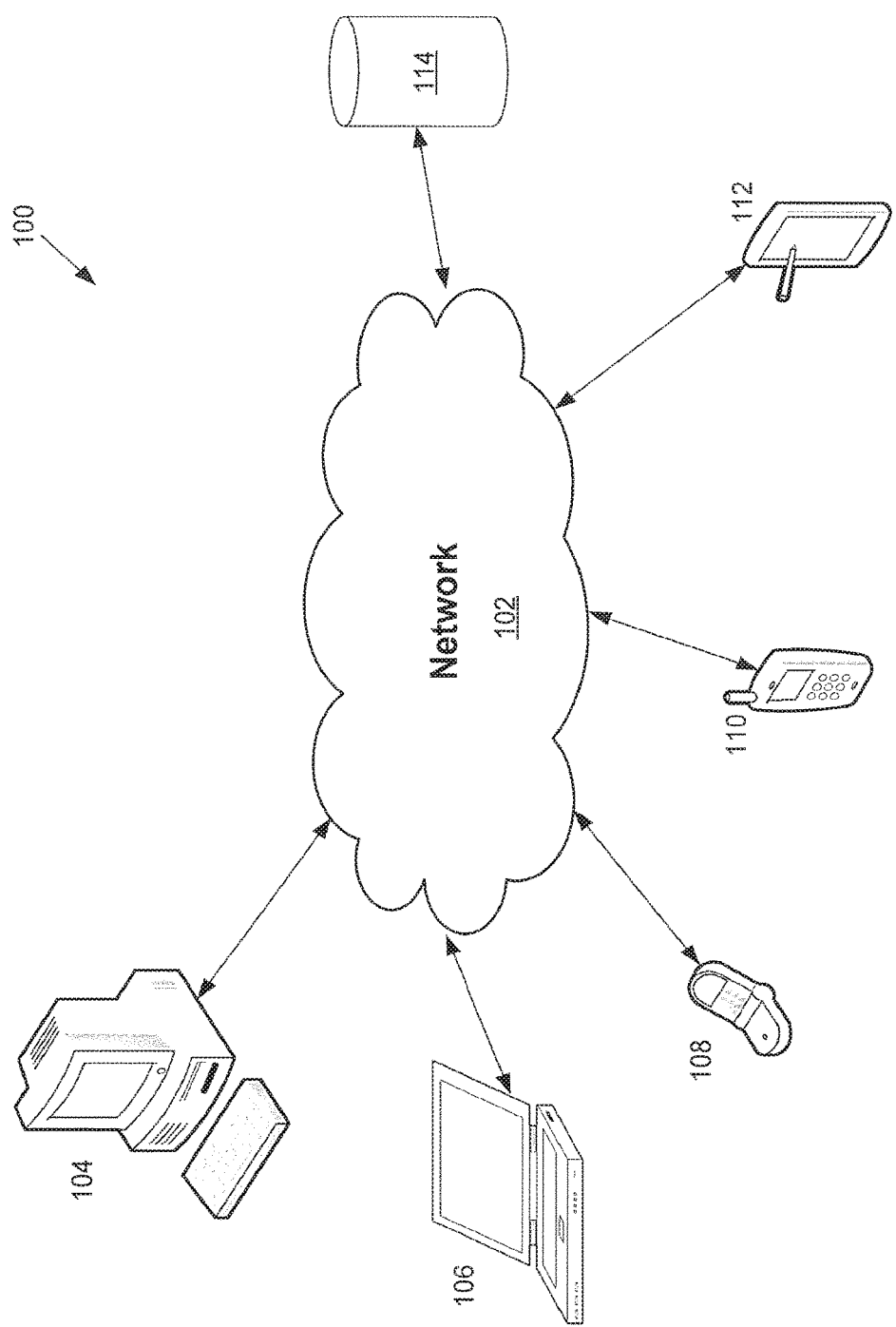
FIG. 1 is a block diagram illustrating an example of a networked system in which embodiments of the disclosed technology may be implemented.

FIG. 1 is a block diagram illustrating an example of a networked system 100 in which embodiments of the disclosed technology may be implemented. In the example, the system 100 includes a network 102 such as the Internet, an intranet, a home network, or any combination thereof. Traditional computing devices such as a desktop computer 104 and laptop computer 106 may connect to the network 102 to communicate with each other or with other devices connected to the network.

The networked system 100 also includes three mobile electronic devices 108-112. Two of the mobile electronic devices, 108 and 110, are mobile communications devices such as cellular telephones or smart phones. The third mobile electronic device, 112, is a handheld device such as a personal data assistant (PDA) or tablet device.

The networked system 100 also includes a storage device 114, which may be a central database or repository, a local data store, or a remote storage device, for example. The storage device 114 may be accessible to any or all of the other devices 104-112, subject to limitations or restrictions by the devices 104-112, a third party, or the storage device 114 itself. The storage device 114 may be used to store some or all of the personal data that is accessed and/or used by any of the computers 104 and 106 or mobile electronic devices 108-112. In situations involving public data, the storage device 114 may also store any or all of the public data accessed and/or used by any of the computers 104 and 106 or mobile electronic devices 108-112.

Figure 2:
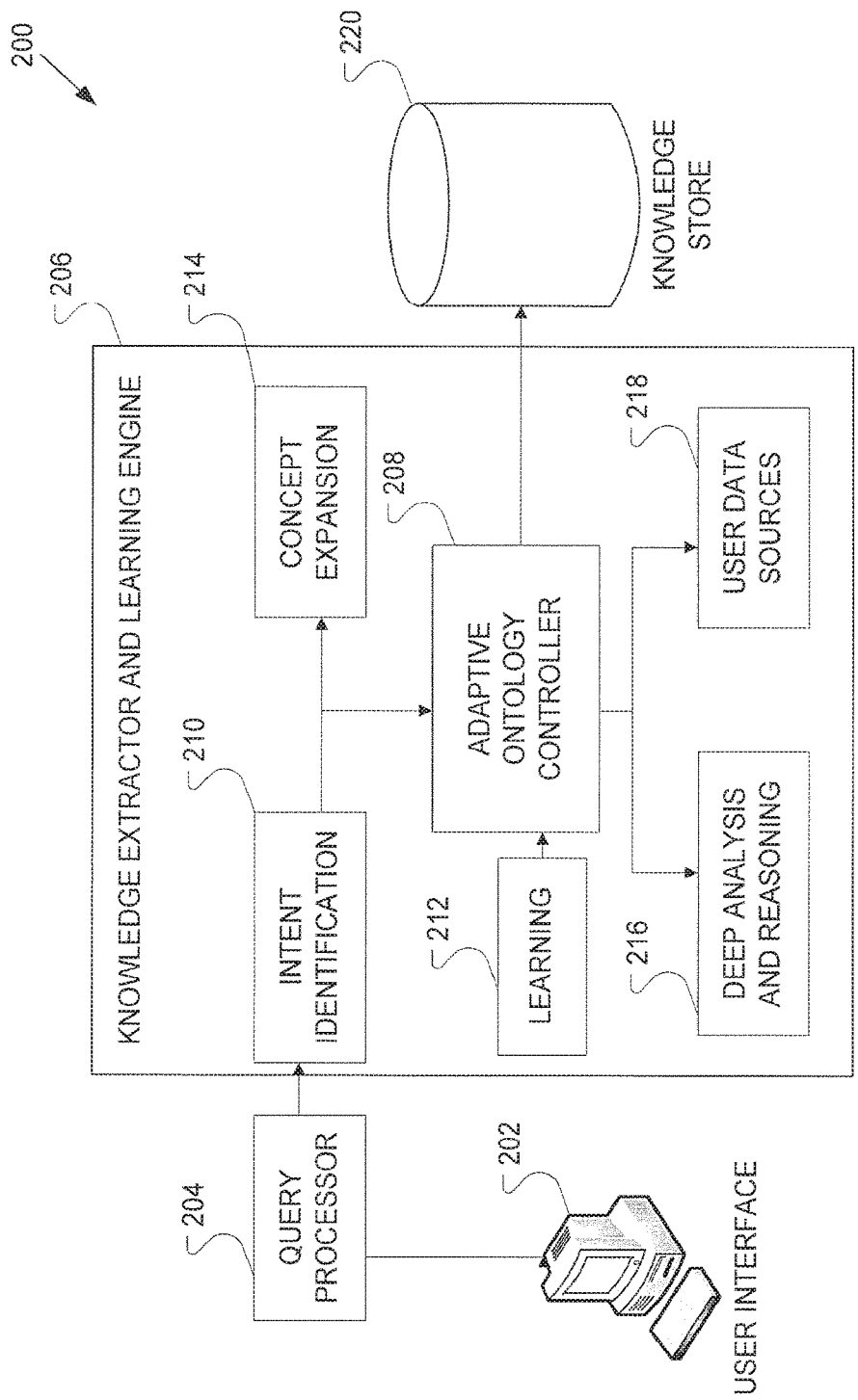
FIG. 2 is a block diagram illustrating an example of a system implementing an adaptive ontology controller in accordance with certain embodiments of the disclosed technology.

FIG. 2 illustrates an example of a system 200 implementing an adaptive ontology controller (AOC) in accordance with certain embodiments of the disclosed technology. A knowledge worker may interact with the system by way of a user interface 202 such as the desktop computer 104 of FIG. 1. A query processor 204 may receive input from the user, such as queries or requests, via the user interface 202 and provide the user input to a knowledge extractor and learning engine (KELE) 206.

The AOC 208 is part of the KELE 206, which includes various other subsystems such as an intent identification module 210, a learning module 212, a concept expansion module 214, a deep analysis and reasoning module 216, and various user data sources 218 that provide personal data and information. The AOC 208 is configured to interact with a knowledge store 220, such as the storage device 114 of FIG. 1.

Figure 3:
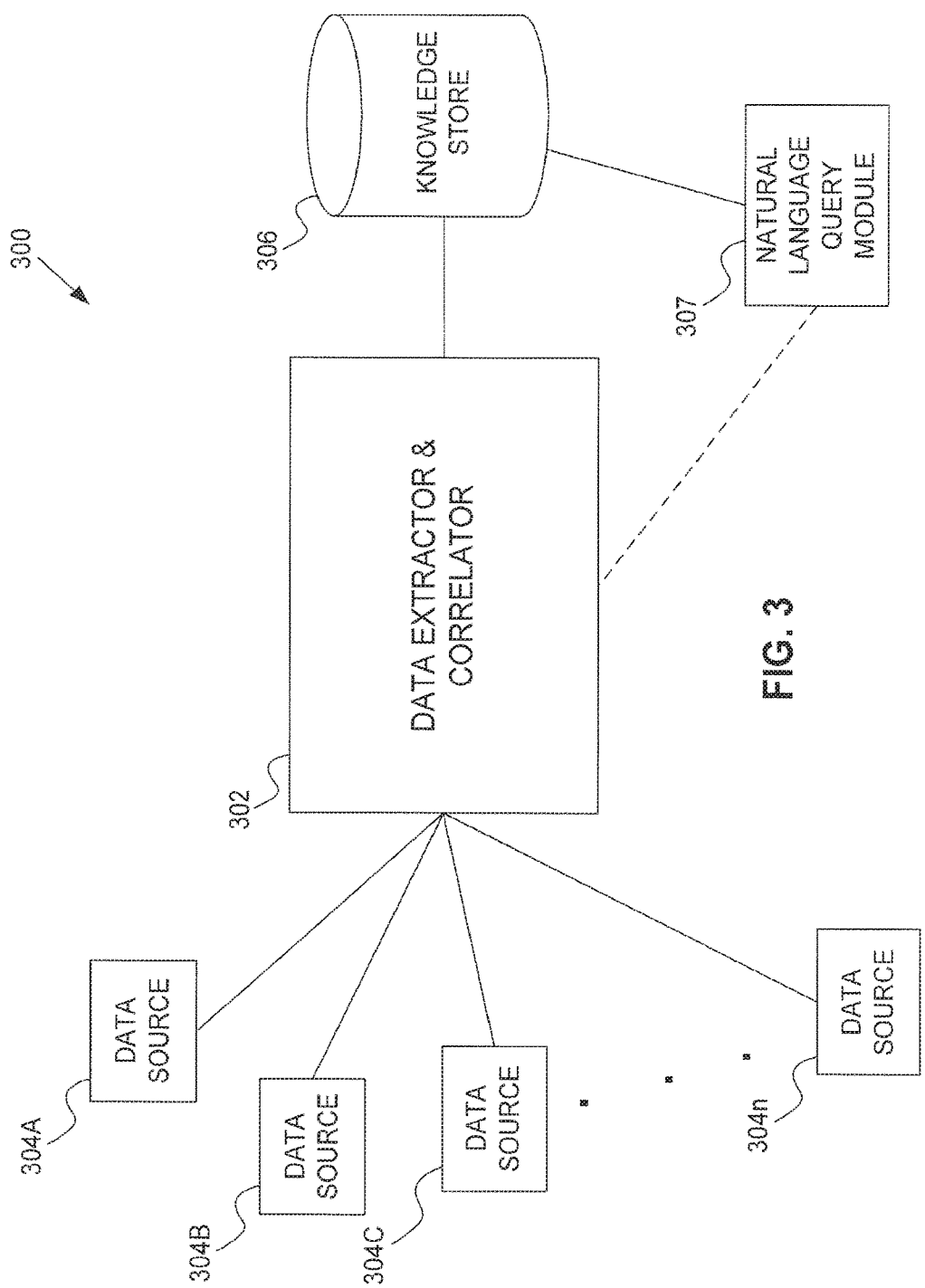
FIG. 3 is a block diagram illustrating an example of a system implementing a data extractor and correlator in accordance with certain embodiments of the disclosed technology.

FIG. 3 is a block diagram illustrating an example of a system 300 implementing a machine-implemented data extractor and correlator 302 in accordance with certain embodiments of the disclosed technology. In the example, the data extractor and correlator 302 is configured to retrieve personal data from any of a number of personal data sources 304A-n. The personal data sources 304A-n may include, but is not limited to, an email message, a calendar item, a customer relationship management (CRM) application object, an address book entry, a tweet, a blog entry, a file, a folder, a presentation, and a document.

The system 300 also includes a knowledge store 306 configured to store knowledge, generally in the form of structured data. As used herein, the term structured data generally refers to data or information that is identifiable because it is organized in a structure. Structured data is typically searchable by data type within content, readily understood by computing devices, and efficiently organized for human readers. Structured data as described herein can generally be used to identify a person, place, or item involved with a particular field or industry, e.g., sales. Such structured data typically includes, but is not limited to, fields in a CRM application, such as contact information, account name, contact name, invoice number, and phone number.

Structured data is usually organized in such a way that it is readily and often easily searchable, presentable, or useable by an application or user. In contrast, the term unstructured data as used herein generally refers to data that has no identifiable structure. Unstructured data may include content that is similar or even identical to corresponding structured data but is not organized in such a way that it is readily or easily searchable, presentable, or useable by an application or user. Whereas data corresponding to a "sender" field in an email message is usually structured data, for example, the typical freeform text of the email body is generally unstructured data.

The data extractor and correlator 302 is configured to retrieve personal data from at least one of the personal data sources 304A-n. For example, the data extractor and correlator 302 may be configured to retrieve all incoming email messages subject to a filter, e.g., all email messages from a certain sender or originator. Alternatively or in addition thereto, the data extractor and correlator 302 may retrieve all documents created by or edited by the user. A functional or actual filter may be used to specify that only certain documents, e.g., documents pertaining to sales involving the user, are to be retrieved by the data extractor and correlator 302.

The data extractor and correlator 302 is further configured to extract information from unstructured data within the retrieved personal data. For example, an email message retrieved from the data extractor and correlator 302 may contain unstructured data such as freeform text in the subject or body of the message. In such a situation, the data extractor and correlator 302 may extract certain words, terms, or phrases, such as contact information or sales-related information, from the unstructured data within the message.

The data extractor and correlator 302 is further configured to correlate the extracted information with previously stored structured data, e.g., stored in the knowledge store 306, to generate additional structured data. For example, consider a situation in which the data extractor and correlator 302 extracts additional information, e.g., a secondary phone number extracted from the body of an email message, that pertains to a sales contact having information, e.g., a name and a primary phone number, that is already stored in the knowledge store 306. The extracted information (secondary phone number) will be correlated with the previously stored structured data (existing name and primary phone number) to generate additional structured data (secondary phone number added to or associated with the existing contact).

The knowledge store 306 is configured to store additional structured data as well as previously stored structured data. The data extractor and correlator 302 thus provides output in the form of enriched knowledge that may be stored within the storage device 306 and used in subsequent queries or applications by the user or other users or even other applications. For example, in the situation described above, a subsequent query by a user involving the sales contact may provide the secondary phone number without the user needing to perform an additional or more detailed search for the information.

Table 1 provides an example of different types of structured data that may be extracted from various types of personal data sources.

TABLE 1

| Personal Data Source Type | Extracted Structured Data |
|---|---|
| Email | From, to, signature, threaded email conversations, subject field, date, time stamp |
| Calendar | Location, time, invitees, attendees, recurrence, time zone |
| CRM | Account, contact, case, opportunity, partners, contact, approval, asset, campaign, lead |
| Address Book | Name, Company, Title, email, phone, fax, web url, IM ID, Chat ID, mobile number |
| Documents and document stores | Last modified time, meta data, header, footer, copy right information, title, author, shared access list |

Table 2 provides an example illustrating how the data extractor and correlator 302 of FIG. 3 may analyze and correlate structured data and convert it into enriched knowledge.

TABLE 2

| Structured Data | Enriched Knowledge |
|---|---|
| Bruce Thomas <bruce.t@zen.com> | First Name: Bruce<br>Last Name: Thomas<br>Possible Org: Zen Inc (common emails domains like yahoo.com, msn.com, gmail.com are excluded). Zen.com is used to collect information about the organization.<br>Company or Org Type: Machine tool and manufacturing industry. Extracted from Zen.com web site<br>Group Members: Information extracted based on all the individuals Bruce Thomas interacts with using the email ID Bruce Thomas.<br>Information Co-relation and Consolidation: All email addresses, phone numbers and other information is co-related and consolidated. |

Certain embodiments of the system 300 of FIG. 3 further include a machine-implemented document harvester configured to retrieve one or more documents from at least one of the personal data sources 304A-n. Such embodiments may further include a machine-implemented document indexer configured to index a plurality of documents harvested, by the document harvester from the personal data sources 304A-n.

A document harvester and indexer may be used to process and index documents including files, e.g., word processing files, spreadsheet files, presentation files, individual slides in presentation files, etc., calendar events, to do lists, notes, emails, email attachments, and web pages. These documents may be retrieved locally from a user's computer and/or remotely from network storage, e.g., a server that stores documents produced by a plurality of users, as well as from the Web, e.g., from web pages via Web application programming interfaces (APIs). The documents may also be tagged and/or clustered.

As documents are harvested, a word popularity dictionary may be created. Word popularity generally refers to a global dictionary containing high frequency words and weights. When a new document is harvested, for example, keywords that do not exist in the dictionary may be added. Stemming may be applied to obtain root words and text may be converted to lowercase. As a user interacts with the system by sending email, visiting web pages etc., the weights in the dictionary can be constantly updated. Keywords in frequently-accessed documents may be given higher weights while keywords in less-important documents may be given lower weights. Consequently, an up-to-date and accurate model of the user's universe and behavior may be effectively constructed.

FIG. 3 includes a natural language query module 307 that may be used to generate responses to natural language queries submitted by users to the system 300. The natural language query module 307 may access structured information stored by the knowledge store 306 and, in some embodiments, the natural language query module 307 may also interface directly with the data extractor and correlator 302. The responses generated by the natural language query module 307 to be provided to the user are based at least in part on the structured information within the knowledge store 306. For example, if a user submits a query pertaining to a sales lead whose information is stored within the knowledge store 306, the natural language query module 307 may automatically generate a response that contains certain information, such as contact information, that pertains to the sales lead.

Figure 4:
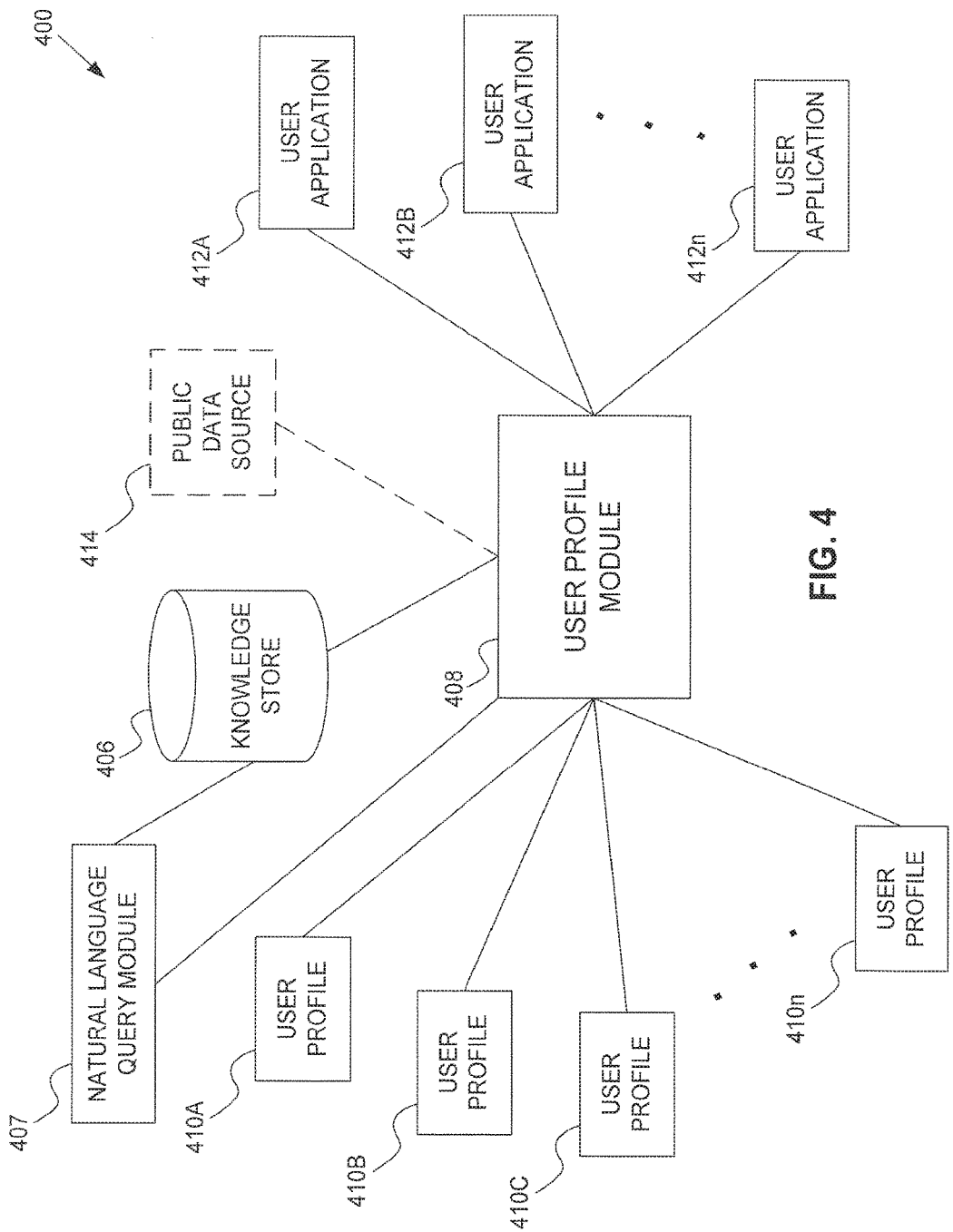
FIG. 4 is a block diagram illustrating an example of a system implementing a user profile module in accordance with certain embodiments of the disclosed technology.

FIG. 4 is a block diagram illustrating an example of a system 400 that includes a machine-implemented user profile module 408 in accordance with certain embodiments of the disclosed technology. Such embodiments are particularly beneficial for applications that aim to adapt to a user by better tailoring to his or her specific needs and preferences.

In the example, the user profile module 408 is configured to interact with any number of user profiles 410A-n. Each user profile may correspond to one or more users. Also, any given user may be associated with multiple user profiles. For example, each user profile may correspond to a certain role, e.g., sales coordinator, that may be assigned to or associated with multiple users. Multiple user profiles 410A-n may correspond to a user's particular situation. For example, a user may have one user profile 410A for work-related items and a second user profile 410B for home-related items. Alternatively or in addition thereto, a user may have one or more profiles that correspond to activities with friends, one or more profiles that correspond to family activities, and one or more profiles that correspond to business-related events.

The user profile module 408 may interact with a knowledge store 406 such as the knowledge store 306 of FIG. 3, for example. The user profile module 408 may also interact with any of a number of user applications 412A-n such as a sales-oriented application, for example. In certain embodiments, a user's experience with a certain user application may be influenced or even driven by one or more of the user profiles 410A-n. For example, if the user is interacting with user application 412B concerning a particular sale involving information associated with user profile 410C, the user profile module 408 may direct the user application 412B to proactively provide certain information, e.g., certain contact information stored within the knowledge store 406, to the user.

In certain embodiments, the user profile module 408 may interact with one or more public data sources 414. For example, a personal corpus or web data often do not provide enough information to build or update a user profile that is detailed or accurate enough for certain applications. In these embodiments, the user profile module 408 may proactively seek or passively receive public information pertaining to a contact whose information is stored by the knowledge store 406. If the new public information is different than the previously stored information, the user profile module 408 may direct the knowledge store 406 and/or one or more of the user profiles 410A-n to update the corresponding information accordingly.

FIG. 4 also includes a natural language query module 407, such as the natural language query module 307 of FIG. 3, that may be used to generate responses to natural language queries submitted by users to the system 400. The natural language query module 407 may access structured information stored by the knowledge store 406 and, in some embodiments, the natural language query module 407 may also interface directly with the user profile module 408. The responses generated by the natural language query module 407 to be provided to the user are based at least in part on the structured information within the knowledge store 406. In certain embodiments, the response is also based on one or more of the user profiles 410A-n. For example, if the query pertains to information stored in user profile 410B, the natural language query module 407 may obtain the information by way of the user profile module 408 and generate a response incorporating that information.

Figure 5:
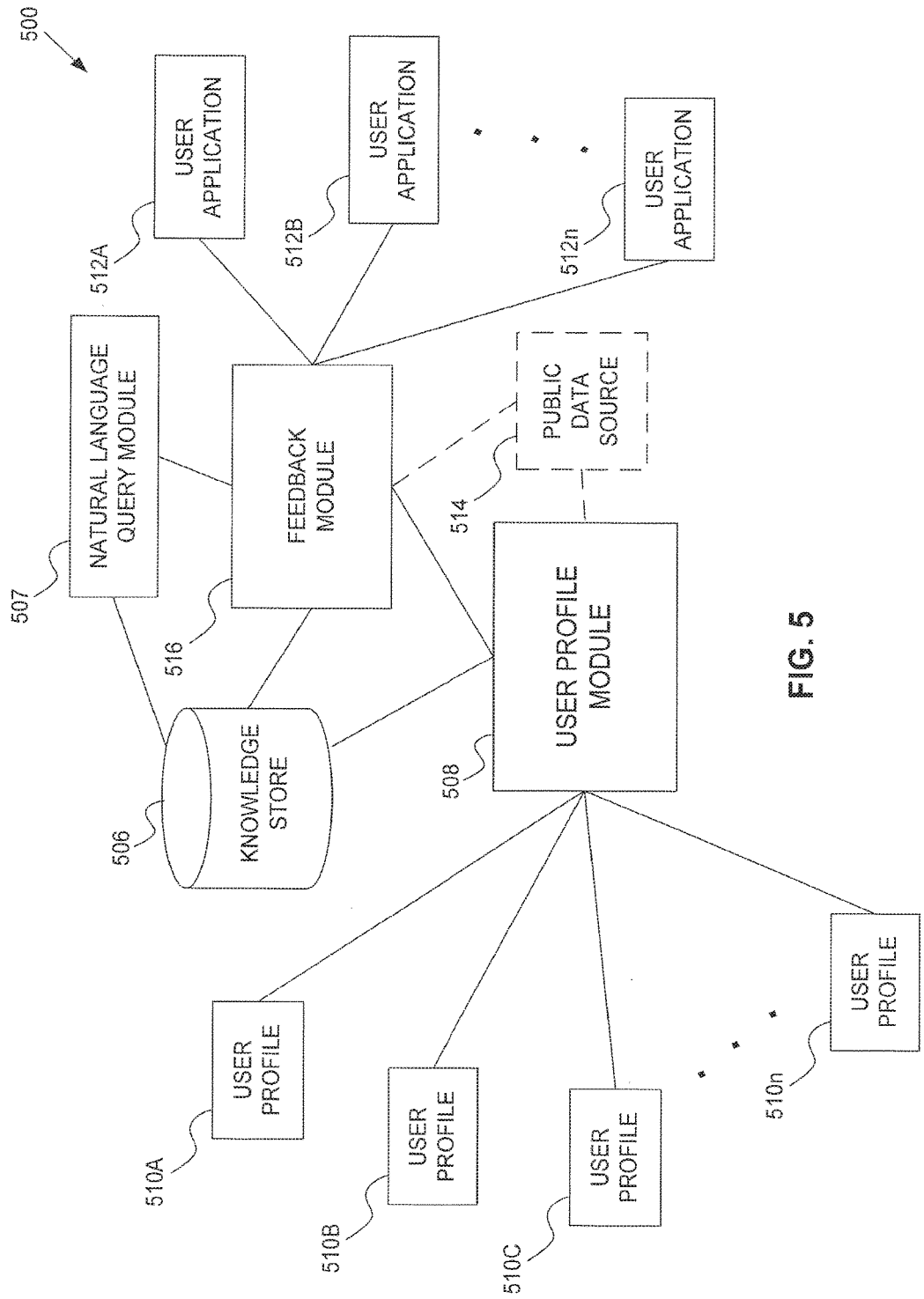
FIG. 5 is a block diagram illustrating an example of a system implementing a feedback module in accordance with certain embodiments of the disclosed technology.

FIG. 5 is a block diagram illustrating an example of a system 500 implementing a feedback module 516 in accordance with certain embodiments of the disclosed technology. In the example, the system 500 includes a user profile module 508, such as the user profile module 408 of FIG. 4, configured to interact with one or more user profiles 510A-n, such as the user profiles 410A-n of FIG. 4. The user profile module 508 is also configured to interact with a knowledge store 506 such as the knowledge store 306 of FIG. 3, for example.

The feedback module 516 may interact with one or both of the user profile module 508 and the knowledge store 506. In certain embodiments, the feedback module 516 may interact with one or more public data source 514 and may cause the user profile module 508 to alter or update one or more of the user profiles 510A-n based on interactions with the public data source(s) 514. In certain embodiments, the feedback module 516 may interact directly with a user associated with one of the user profiles 510A-n. Alternatively or in addition thereto, the feedback module 516 may interact directly with one or more user applications 512A-n, such as the user applications 412A-n of FIG. 4.

Consider a situation in which user profile 510B involves a particular sales contact whose contact information just changed and is broadcast via the public data source 514. The feedback module 516 may direct the user profile module 508 to update one or more of the user profiles 510A-n with the new public information concerning the sales contact. The user profiles 510A-n can be continually updated and enriched as more searches are conducted and in an increasingly refined manner. For example, suggestions provided to a user based on his or her user profile(s) may be increasingly relevant as time goes on.

In embodiments where the feedback module 516 interacts with one or more user applications 512A-n, the feedback module 516 may be triggered to direct the user profile module 508 to update one or more of the user profiles 510A-n responsive to the interaction with the user application(s) 512A-n. For example, if the feedback module 516 detects a user updating a contact mailing address in user application 512B, the feedback module 516 may direct the user profile module 508 to update any of the user profiles 510A-n that include a mailing address for the contact.

FIG. 5 also includes a natural language query module 507, such as the natural language query module 307 of FIG. 3, that may be used to generate responses to natural language queries submitted by users to the system 500. The natural language query module 507 may access structured information stored by the knowledge store 506 and, in some embodiments, the natural language query module 507 may also interface directly with the feedback module 516. The responses generated by the natural language query module 507 to be provided to the user are based at least in part on the structured information within the knowledge store 506 and, in some embodiments, may be adjusted based on information provided by the feedback module 516. For example, a response to the natural language query may take into account pertinent information from user profile 510B (by way of the user profile module 508) responsive to an indication from the feedback module 516 that the pertinent information has changed, e.g., due to an event that has occurred or is occurring at the public data source 514.

Figure 6:
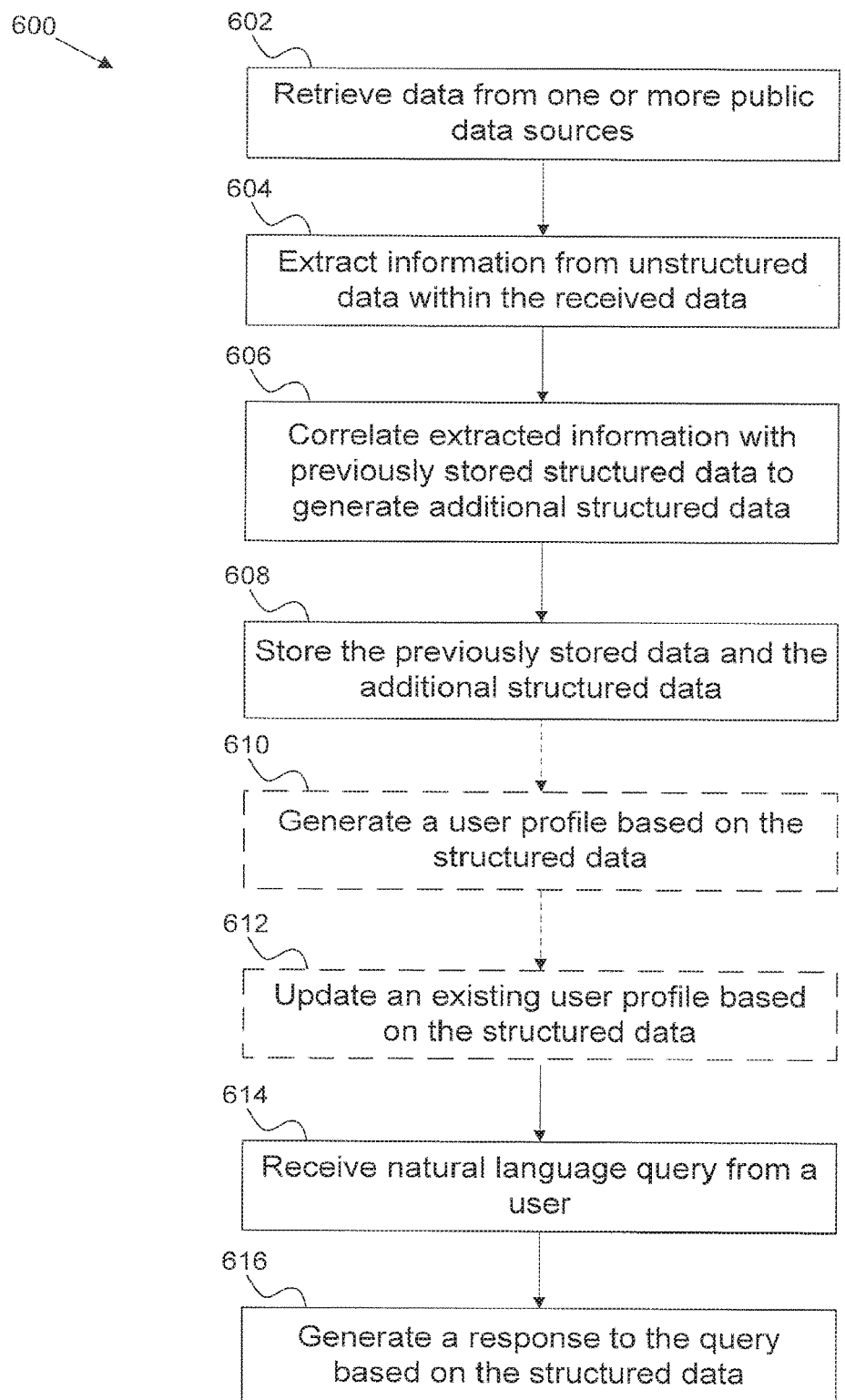
FIG. 6 is a flowchart illustrating an example of a machine-implemented method in accordance with certain embodiments of the disclosed technology.

FIG. 6 is a flowchart illustrating an example of a machine-implemented method 600 in accordance with certain embodiments of the disclosed technology. At 602, data is retrieved from one or more data sources. For example, a machine-implemented data extractor and correlator, such as the data extractor and correlator 302 of FIG. 3, may retrieve personal data from one or more personal data sources, such as the personal data sources 304A-n of FIG. 3.

At 604, information is extracted from unstructured data within the data retrieved at 602. For example, a data extractor and correlator, such as the data extractor and correlator 302 of FIG. 3, may extract information pertaining to a sales order such as one or both of an invoice number and a contact name. Such information may be unstructured in that it is neither organized in a structured manner nor readily classifiable or useable without modification or organizing. For example, the information may be a free-text piece of data such as the body of an email message.

The information extraction performed at 604 may be accomplished by breaking at least one sentence into subject, verb, and object (SVO), extracting phrases that link a subject to an object, extracting at least one word in close proximity to an identified feature or service, extracting at least one word in close proximity to a known quality, or any combination thereof. Features with certain quality or derived quality ratings may be tagged for reviews, for example. Also, structures that approximate concepts from documents with and without prior semantic understanding may be constructed.

At 606, some or all of the extracted information is correlated with previously stored structured data to generate additional structured data. For example, a data extractor and correlator, such as the data extractor and correlator 302 of FIG. 3, may correlate the invoice number and/or contact name discussed above with an existing order and/or contact having associated structured data stored within a knowledge store, such as the knowledge store 306 of FIG. 3. The knowledge store may store both the additional structured information and the previously stored structured data as indicated at 608.

In certain embodiments, the retrieved data includes supplemental structured data, e.g., structured data that has not yet been stored within a knowledge store. In these situations, the data extractor and correlator may correlate the supplemental structured data with one or both of the previously stored structured data and the additional structured data to generate further structured data that may be stored by the knowledge store.

Certain embodiments may include retrieving public data from one or more public data sources. In these embodiments, a data extractor and correlator may extract public information from unstructured data within the retrieved public data and correlate the extracted public information with previously stored structured data to generate further additional structured data that may be stored by the knowledge store.

In certain embodiments, a user profile, such as the user profiles 410A-n of FIG. 4, may be generated based at least in part on one or both of the previously stored structured data and the additional structured data, as indicated at 610. Alternatively or in addition thereto, an existing user profile may be updated based at least in part on one or both of the previously stored structured data and the additional structured data, as indicated at 612. Generation and modification of user profiles may be performed by a user profile module, such as the user profile module 408 of FIG. 4.

At 614, a natural language query is received from a user. For example, a user wishing to research a particular sales lead may provide the following query: "has there been any recent progress with sales lead XYZ Manufacturing?" The system then generates a response to the natural language query received at 614, as indicated at 616. The response is based at least in part on one or both of the previously stored data and the additional structured data. For example, if the stored structured data contains information pertaining to XYZ manufacturing, the generated response may provide said information to the user in the response.

Figure 7:
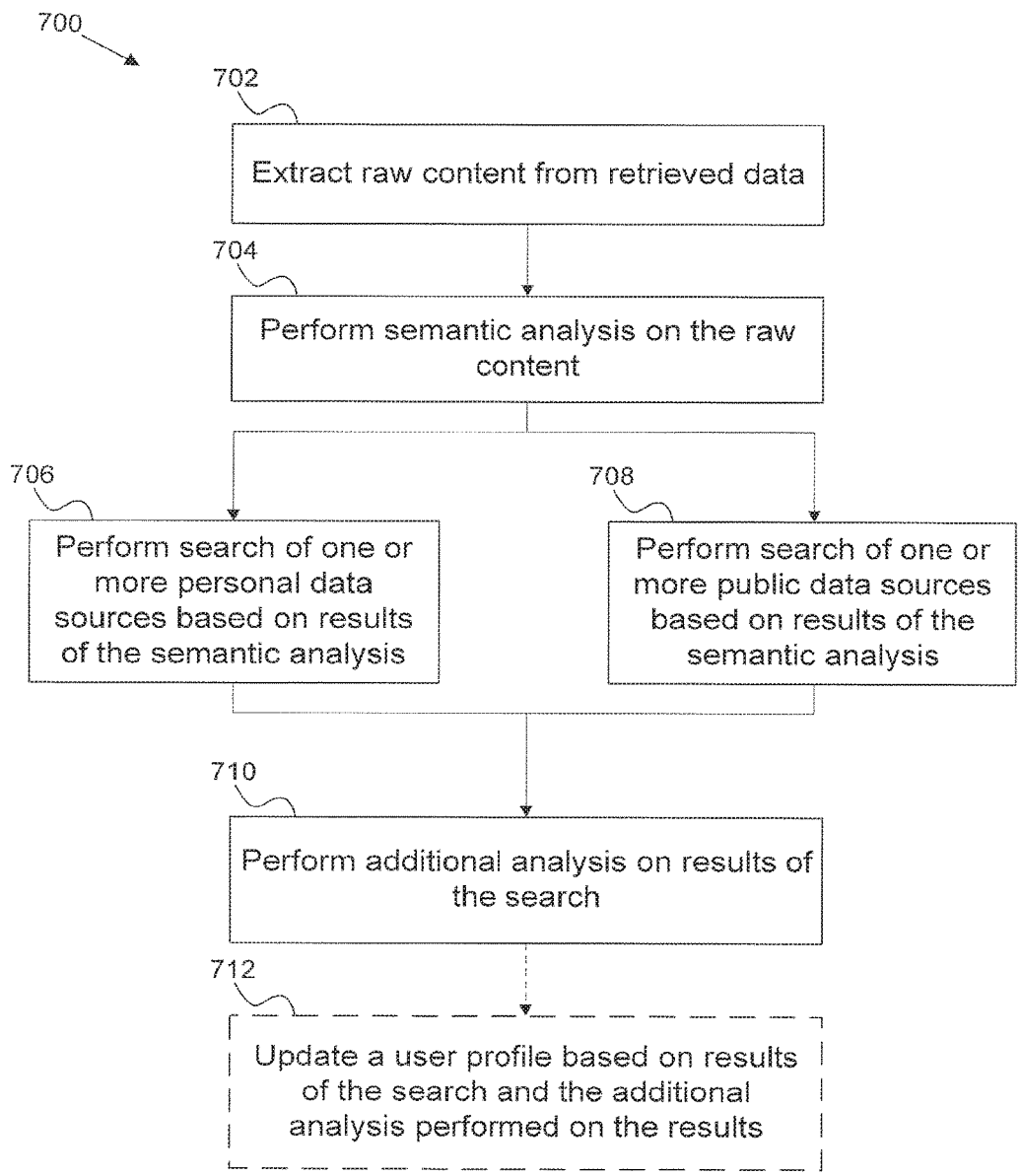
FIG. 7 is a flowchart illustrating an example of another machine-implemented method in accordance with certain embodiments of the disclosed technology.

FIG. 7 is a flowchart illustrating an example of another machine-implemented method 700 in accordance with certain embodiments of the disclosed technology. At 702, raw content is extracted from retrieved data, such as the personal and/or public data retrieved at 602 of FIG. 6.

At 704, semantic analysis is performed on the raw content. For example, a semantic analysis module may be configured to determine semantic information based on unstructured data within the retrieved data. A data extractor and correlator, such as the data extractor and correlator 302 of FIG. 3, may be configured to correlate the extracted information with previously stored structured data based at least in part on the semantic information.

Certain embodiments include performing a search of one or more data sources based on results of the semantic analysis performed at 704. Such embodiments may include performing a search of one or more personal data sources, as indicated by 706, or performing a search of one or more public data sources, as indicated by 708.

At 710, an additional analysis is performed based at least in part on the results of the search performed at either 706 or 708. In certain embodiments, a user profile, such as the user profiles 410A-n of FIG. 4, may be updated, e.g., by a user profile module, based on one or both of the results of the search performed at either 706 or 708 and the additional analysis performed at 710. The additional analysis performed at 710 may include an inference analysis, a topic analysis, information tagging, information clustering, or some combination thereof. Probabilistic links may also be created based on the additional analysis. Over time, topics may be augmented, merged, deleted, or split depending on the analysis. Also, sub-topics may be created based on the analysis.

Figure 8:
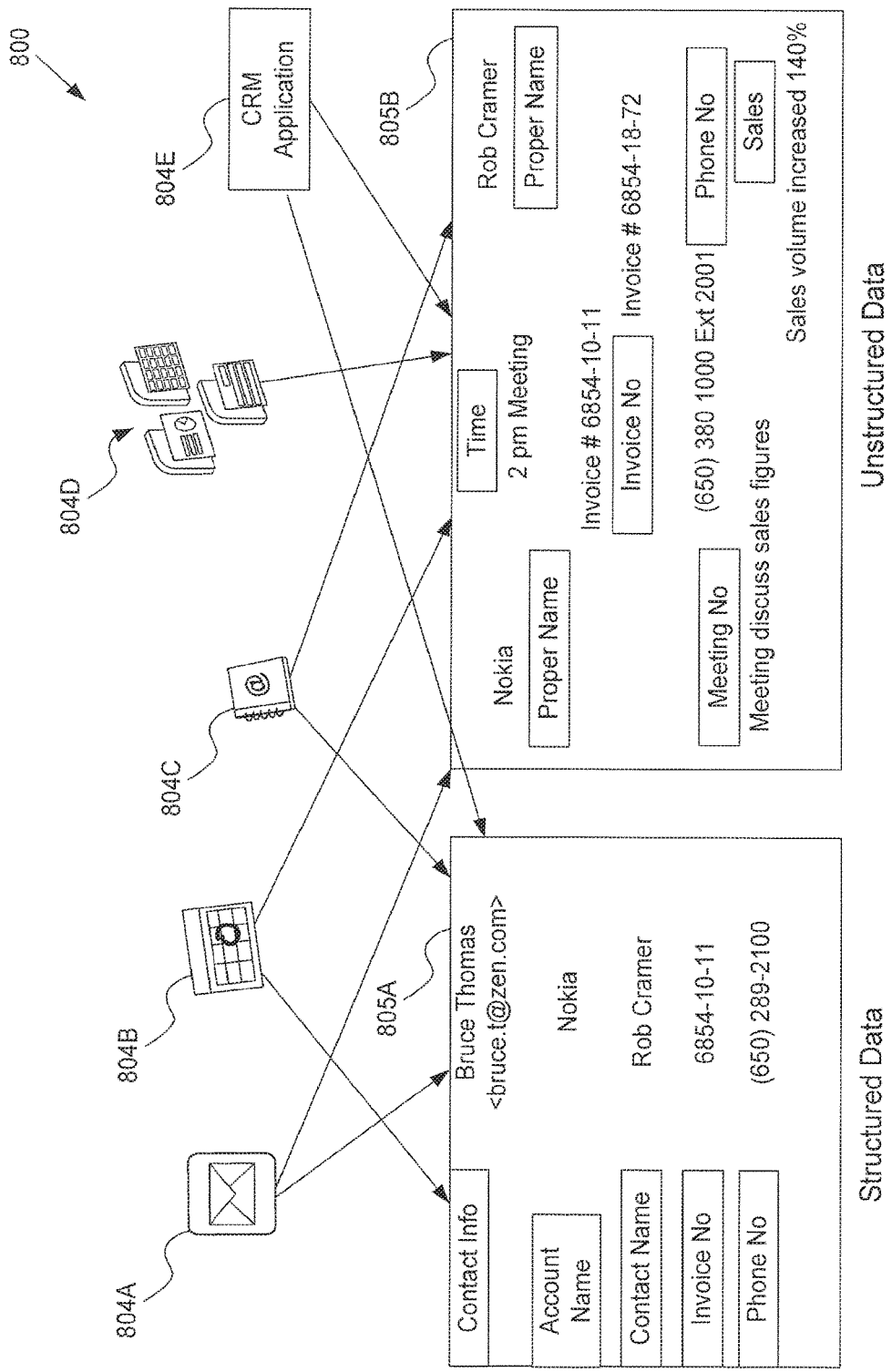
FIG. 8 is a block diagram illustrating an example of a system involving structured data and unstructured data retrieved from multiple data sources in accordance with certain embodiments of the disclosed technology.

FIG. 8 is a block diagram illustrating an example of a system 800 involving structured data 805A and unstructured data 805B retrieved from multiple data sources in accordance with certain embodiments of the disclosed technology. In the example, the data sources include multiple personal data sources 804A-E: an email message 804A, a calendar item 804B, an address book object 804C, an application-specific document 804D, and a CRM application object 804E.

In the example, the data sources 804A-E collectively yield five pieces of structured data 805A that may be retrieved, for example, by a data extractor and correlator: sales contact information (name and email address), account name, contact name, invoice number, and phone number. The data sources 804A-E also provide various pieces of unstructured data 805B: two proper names (person and company), meeting time, two invoice numbers, a phone number, meeting-specific information, and sales-specific information.

Certain information, e.g., invoice numbers, from the unstructured data 805B may be correlated with the structured data 805A. Such correlation may include identifying, extracting, or building at least one relationship between the extracted information and previously stored structured data. For example, one or more features identified within the extracted information may be tagged or otherwise marked for subsequent operations. Parts of speech analysis may also be performed and then enriched by relationship determinations.

In certain embodiments, correlation and relationship building may include categorizing one or more portions of the unstructured data. Portions of the unstructured data 805B may each be broken into subject, verb, and object (SVO). Phrases linking a subject to an object may be extracted. A determination may be made as to certain words in close proximity to an identified feature or service, known quality, or any combination thereof.

Consider an example in which the word "Apple" in unstructured free-flowing data could have multiple meanings. The word could refer to a fruit, the name of a company, the name of a person, etc. Relationships may be established to decipher the meaning of certain unstructured data. A possible association to each of these entities can be created and those that have a high probability based on parts of speech analysis and entity relationship identification, for example, may be strengthened. In the present example, an inference may be made that "Apple" is a company based on its learning from a prior structured data analysis. Table 3 provides an indication as to the relationships for "Apple" that may be identified from structured data. In the example, the word "Apple" occurs along with "Apple Thomas" and "Rob Cramer."

TABLE 3

| Structured Data | Relationship Identification |
| --- | --- |
| Apple in Apple Thomas | First name of an person |
| Apple | Company or business entity name |
| Apple Thomas | Name of an person |
| Rob Cramer | Name of a person |

Figure 9:
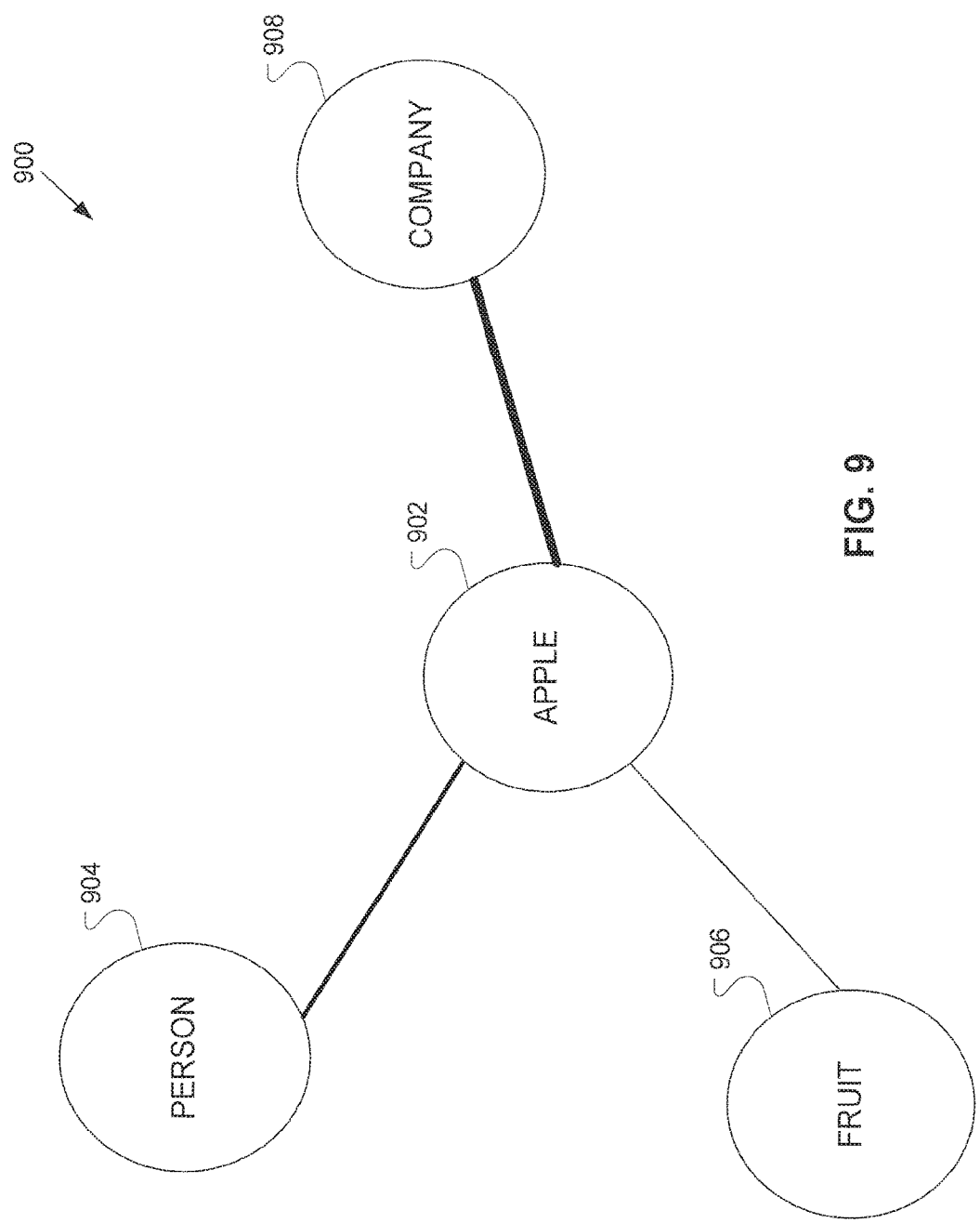
FIG. 9 illustrates an example that shows possible relationships between the word "Apple" and various types of entities that may be defined.

FIG. 9 illustrates an example 900 that shows the possible relationships that may be defined between the word "Apple" 902, as discovered in unstructured data, and the various types of entities, e.g., a person 904, a fruit 906, or a company 908, as discussed above. As indicated visually in the figure by the different thicknesses of the connecting lines, the word "Apple" as identified in the unstructured data has been determined to refer to a company name and not to a fruit or a person based on the relative strength of the determined relationship therebetween.

In certain embodiments, one or more patterns may be extracted or determined from structured data, such as previously stored structured data, to create pattern fingerprints. Patterns may subsequently be extracted from the unstructured data using these pattern fingerprints. For example, structured data may be used to construct a pattern fingerprint knowledge base and then use the pattern fingerprinting knowledge to recognize similar items from unstructured data and establish their relationship with various entities. For example, fingerprint data patterns can be learned and determined for sales and/or contact-related attributes such invoice number, P.O. number, and phone number. These learnings may be applied to identify similar patterns in unstructured data and identify additional relationships between entities.

Certain implementations of the disclosed technology may include personalized searching capabilities and features, personalized content delivery, personalized advertisement delivery, intelligence gathering and analysis, and automated augmentation of knowledge bases.

Embodiments of the disclosed technology may be implemented as machine-directed methods or physical devices. Accordingly, certain implementations may take the form of an entirely-hardware embodiment, an entirely-software embodiment, or an embodiment combining both hardware and software aspects. For example, some or all of the components for any given embodiment may be computer-implemented components.

Having described and illustrated the principles of the invention with reference to illustrated embodiments, it will be recognized that the illustrated embodiments may be modified in arrangement and detail without departing from such principles, and may be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

What is claimed is:

1. A non-transitory computer-readable medium comprising instructions for a computer program for updating user profiles, the instructions operable to:

store structured data in the user profiles;

extract one or more patterns from the stored structured data to create one or more pattern fingerprints;

retrieve unstructured personal data from personal data sources;

extract one or more patterns from the unstructured personal data using the one or more pattern fingerprints;

correlate the unstructured personal data with the stored structured data in the user profiles, using the one or more patterns from the unstructured personal data, to generate additional structured data;

update the user profiles with the additional structured data;

receive a query; and provide a query response based at least in part on the structured data and the additional structured data in the user profiles, wherein at least some of the user profiles are associated with different user roles for a same user.

2. The computer program of claim 1, wherein the personal data sources include email messages and calendar items.

3. The computer program of claim 1, wherein the personal data sources include customer relationship management (CRM) application objects.

4. The computer program of claim 1, further comprising instructions operable to:
   retrieve data from different user applications; and
   update the user profiles with at least some of the data retrieved from the different user applications.

5. The computer program of claim 4, wherein the user applications include a customer relationship management (CRM) application.

6. The computer program of claim 1, further comprising instructions operable to:
   retrieve public data from public data sources; and
   correlate the public data with the stored structured data in the user profiles to generate at least some of the additional structured data.

* * * * *